United States Patent [19]
Moulinet

[11] Patent Number: 6,093,108
[45] Date of Patent: Jul. 25, 2000

[54] BELLOWS DEVICE, ITS APPLICATION TO A TRANSMISSION JOINT, AND RING FOR A DEVICE OF THIS KIND

[75] Inventor: François Moulinet, Triel sur Sein, France

[73] Assignee: GKN Automotive AG, Lohmar, Germany

[21] Appl. No.: 09/040,085

[22] Filed: Mar. 17, 1998

[30] Foreign Application Priority Data

Mar. 18, 1997 [FR] France ................................. 97 03295

[51] Int. Cl.[7] ............................................. F16C 1/26
[52] U.S. Cl. ............................................. 464/173; 24/20 R
[58] Field of Search ................................. 24/20 R, 459; 464/173, 175; 277/634, 635; 285/299; 403/50, 51; 411/395, 424, 436, 908, 917

[56] References Cited

U.S. PATENT DOCUMENTS

| | | | |
|---|---|---|---|
| 1,799,941 | 4/1931 | Wulle | 411/395 X |
| 3,490,343 | 1/1970 | Afanador et al. | 403/51 X |
| 4,685,686 | 8/1987 | Weiler | 403/50 X |
| 5,707,066 | 1/1998 | Sugiura et al. | 464/175 X |

FOREIGN PATENT DOCUMENTS

| | | | |
|---|---|---|---|
| 1145311 | 10/1957 | France | 277/634 |
| 2661469 | 10/1991 | France | 464/175 |
| 8-159298 | 6/1996 | Japan . | |
| 1200170 | 7/1970 | United Kingdom | F16J 15/52 |
| 2209380 | 5/1989 | United Kingdom | F16D 3/21 |
| 2259349 | 3/1993 | United Kingdom . | |

*Primary Examiner*—Terry Lee Melius
*Assistant Examiner*—Greg Binda
*Attorney, Agent, or Firm*—Melissa M. Koehn

[57] ABSTRACT

The invention concerns a bellows device (17) including an elastic bellows (19) adapted to be connected at a first end to a first rotary member (9) and the second end of which has a portion (24) turned back axially outwards, the free end of this turned back portion being adapted to be fixed to a second rotary member (11). The device includes a rigid member (21) for stabilizing the bellows (19) including a radially external connecting part adapted to assure axial retention of said member (21) relative to the second rotary member (11) and a radially internal part (33) adapted to extend axially towards the turned back portion (24), inside the latter, and to have an annular surface facing the bellows (19) that is free of sharp edges.

9 Claims, 2 Drawing Sheets

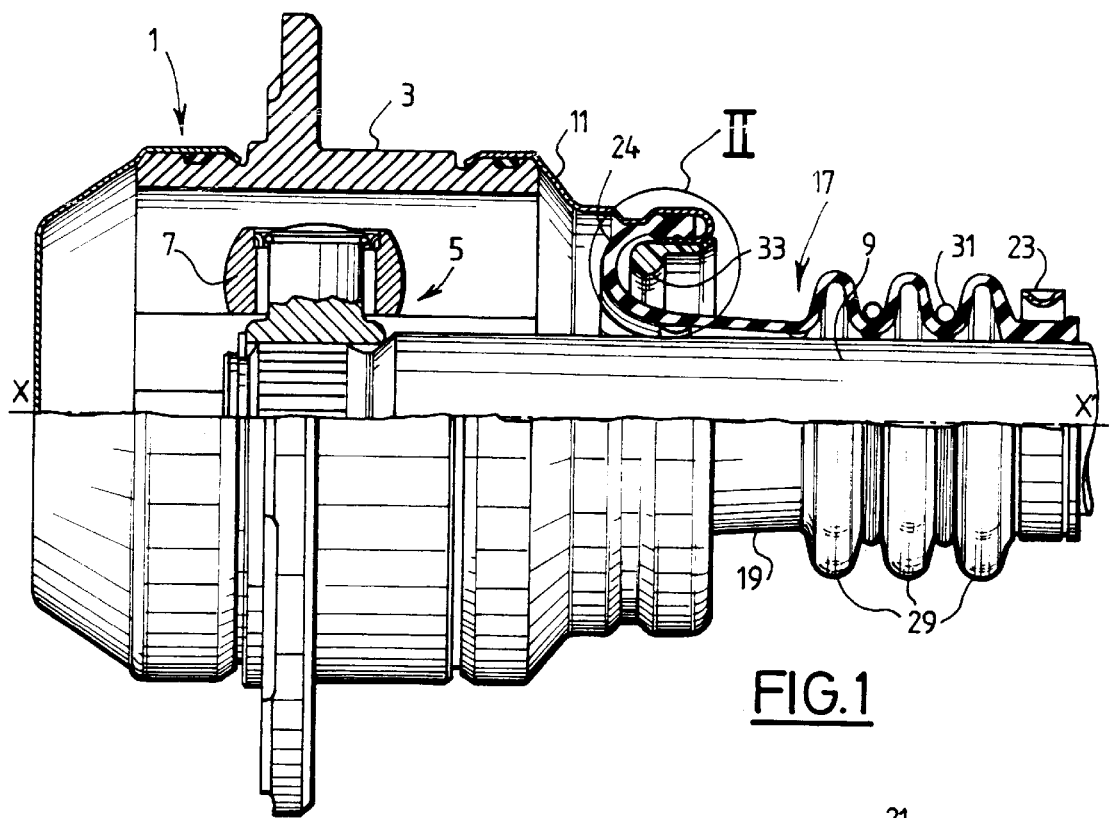
FIG. 1
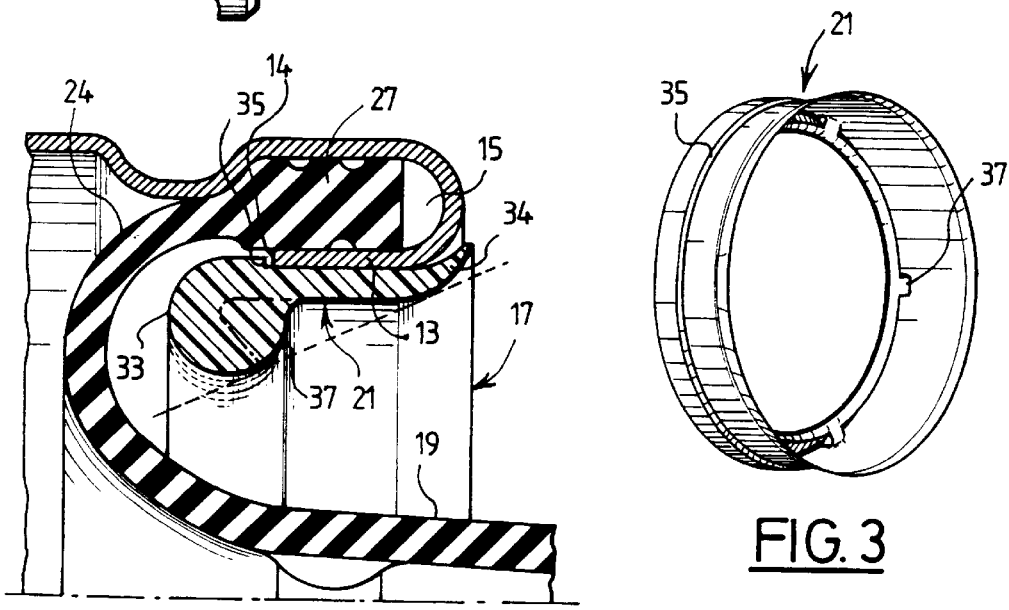
FIG. 2
FIG. 3

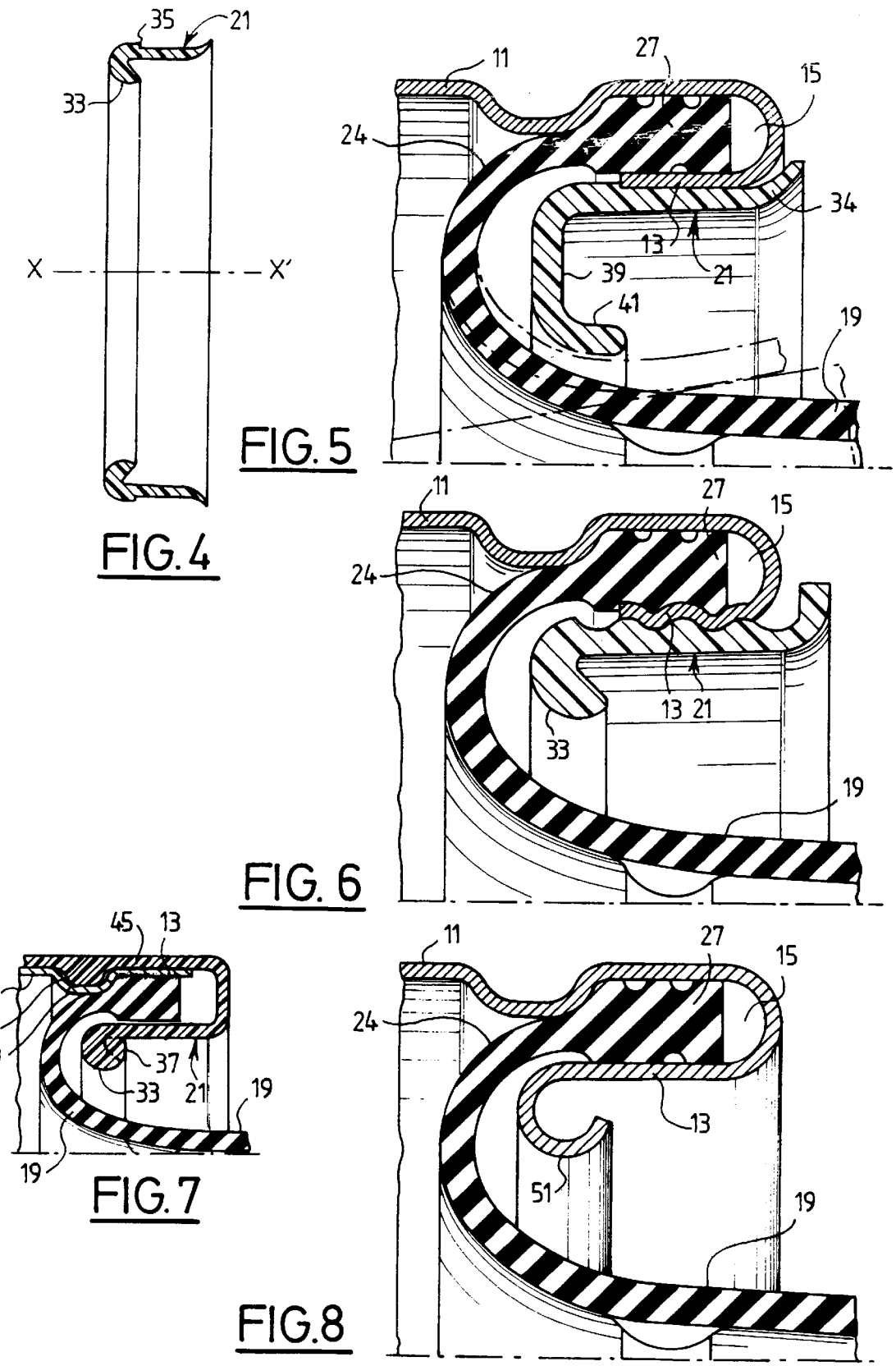

BELLOWS DEVICE, ITS APPLICATION TO A TRANSMISSION JOINT, AND RING FOR A DEVICE OF THIS KIND

BACKGROUND OF THE INVENTION

The invention concerns a bellows device of the type comprising an elastic bellows adapted to be connected at a first end to a first rotary member and the second end of which is turned back axially outwards, the free end of the turned back portion being adapted to be fixed to a second rotary member.

The invention applies to constant velocity joints transmitting rotary movement between two shafts, in particular in automobile vehicles. Joints of this kind generally comprise a joint body attached to one of the shafts and surrounding a device transmitting rotary movement between the two shafts, for example a tripod device.

A bellows device is then connected to one of the shafts and to a cover extending the joint body attached to the second shaft in order to protect the transmission device against foreign bodies and to retain the lubricant therein.

When one of the shafts is rotated the bellows tends to move away from the first shaft because of centrifugal forces. The general arrangement of the aforementioned type of bellows device and in particular the turning back of the bellows holds the bellows near the first shaft and therefore limit the effect of such forces.

However, for high rotation speeds the outward movement of the bellows due to centrifugal forces can become sufficient to cause it to crease at the inside boundary where the free edge of its turned back portion is fixed to the cover.

Because of high rotation frequencies, this creasing lead to premature wear and to tearing of the bellows in the area of the crease. Problems of this kind are encountered in particular in constant velocity transmission joints operating in high-temperature and/or low-pressure environments (for example at high altitudes). In such cases the pressure inside the bellows is greater than the external pressure which encourages movement of the bellows away from the first shaft.

An aim of the invention is to provide a solution to the problems mentioned above and in particular to provide a bellows device capable of operating at high rotation speeds and in high-temperature or low-pressure environments with limited damage to the bellows.

SUMMARY OF THE INVENTION

To this end, the invention consists of a bellows device of the aforementioned type characterized in that it includes a rigid member for stabilizing the bellows including a radially external connecting part adapted to assure axial retention of said member relative to the second rotary member and a radially internal part adapted to extend axially towards the turned back portion, inside the latter, and to have an annular surface facing the bellows that is free of sharp edges.

The bellows device of the invention can have one or more of the following features:

- the radially internal part of the bellows stabilizing member is adapted to extend axially towards the back of the turned back portion beyond the inside boundary of the fixing of the free end of the turned back portion to the second rotary member;
- the annular surface is substantially toroidal;
- the annular surface is adapted to extend radially towards the first rotary member with a minimal clearance for relative movement of the first rotary member and the bellows;
- the free end of the turned back portion has an annular bead, the free end of the second rotary member is bent and forms a groove in which the bead is housed and fixed, and the bellows stabilizing member is a ring in one or more parts the axially internal end of which constitutes the internal part extending towards the turned back portion and a radially external surface of which is adapted to cooperate with a radially internal surface of the bent free end of the second rotary member;
- the radially external surface of the ring is flared outwards at the axially external end of the ring and has a shoulder for snap fastening and axially positioning the ring relative to the second rotary member adapted to bear on the edge of said bent free end of the latter;
- the free end of the turned back portion has an annular bead and the free end of the second rotary member is bent and forms a groove in which the bead is housed and fixed and is then extended by a bent rim constituting the stabilizing member;
- the bellows stabilizing member is a ring in one or more parts the axially external end of which is bent outwards and is adapted to cooperate with the radially external surface of the second rotary member to retain the ring axially, in particular by snap fastener means;
- the bellows device includes means for adjusting the axial position of said member relative to the second rotary member, in particular by mutual screwing.

The invention also consists in a ring in one or more parts constituting the stabilizing member of a bellows device as defined hereinabove.

Finally, the invention consists in a transmission joint including a first rotary member and a second rotary member characterized in that it includes a bellows device as defined hereinabove.

BRIEF DESCRIPTION OF THE DRAWINGS

Embodiments of the invention will now be described with reference to the appended drawings in which:

FIG. 1 is a view in longitudinal half-section of a transmission joint in accordance with the invention, FIG. 2 is a view to a larger scale of the encircled part II of FIG. 1, FIG. 3 is a perspective view of the ring of the bellows device of the transmission joint from FIG. 1, FIG. 4 is a view of the ring from FIG. 3 in longitudinal section on a section plane different from that in FIG. 1, FIGS. 5 through 8 are views similar to FIG. 2 each showing another embodiment of the invention.

DETAILED DESCRIPTION

FIG. 1 shows a sliding tripod constant velocity transmission joint 1. The rotary joint 1 has ternary symmetry about an axis XX' in the aligned position represented and includes a joint body 3. The joint body 3 encloses a tripod transmission device 5 which has spherical rollers 7 and is connected to a first rotary first rotary shaft 9. The joint body 3 is attached to a second shaft, not shown, concentric with the axis XX'.

A transmission joint of the above kind is conventional and transmits rotary movement between the two shafts allowing movement in translation in the direction of the axis XX' and angular movement of the first shaft relative to the second.

The joint body 3 is extended by a sheet metal cover 11 attached to it and surrounding the first shaft 9 at a distance.

The cover 11 is bent through 180° towards the axis XX' at its free end 13 to form an annular groove 15 the function of which is specified below.

The transmission joint 1 further includes a bellows device 17 surrounding the first shaft 9 and including an elastic bellows 19 and a rigid plastics material ring 21.

The bellows 19 is generally cylindrical. The axially external end of the bellows is connected to the first shaft 9 by a clip 23 shown loosened in FIG. 1.

The other end of the bellows 19 has a portion 24 turned back axially and outwards (FIG. 2). The free end of this turned back portion includes an annular bead 27. The bead 27 is crimped into the annular groove 15 on the cover 11. The intermediate part of the bellows 19 has transverse folds 29 and rings 31 are provided between the folds 29 to hold the bellows 19 as close as possible to the shaft 9 as far as the turned back portion 24.

The ring 21 is generally cylindrical in shape. Its axially internal end has a bead 33 with a substantially toroidal outside surface projecting towards the axis XX' and the axially external end 34 of the ring is flared outwardly.

The radially external surface of the ring 21 has a snap fastener shoulder 35 facing axially outwards. Six equiangularly spaced reinforcing lugs 37 connect the radially internal surface of the ring 21 to the bead 33. One lug 37 is in the FIG. 2 section plane. The longitudinal section plane of FIG. 4 has been chosen so that it does not intercept any of the lugs 37.

The ring 21 is retained axially relative to the cover 11 in one direction by the flared axially external end 34 of the ring and in the other direction by the snap fastener shoulder 35, which is retained by the edge 14 of the free end 13 of the cover 11. The radially external surface of the ring 21 therefore cooperates with the radially internal surface of the bent free end 13 of the cover 11 to retain the ring axially. Slight axial clearance between the ring 21 and the cover 11 can be tolerated, as shown in FIG. 2.

The bead 33 extends parallel to the axis XX' towards the back of the turned back portion 24, beyond the inner boundary where the bellows 17 is fixed to the cover 11, constituted by the edge 14 of the latter. The surface of the bead 33 does not have any sharp edges facing the bellows 19. Moreover there are no sharp edges, for example moulding flash, projecting towards the bellows beyond the tangent (shown in dashed line in FIG. 2) common to the outside surface of the bead 33 and to the flare 34 of the ring 21.

If one of the shafts is rotated all of the transmission joint 1 is rotated. At high rotation speeds centrifugal force tends to move the bellows 19 away from the shaft 9.

The bellows 19 is stabilized by the bead 33 of the ring 21 which prevents excessive creasing of the bellows 19, in particular in the region of the edge 14 of the cover and of the boundary between the bead 27 and the remainder of the bellows 19.

The absence of sharp edges on the surface of the bead 33 facing the bellows 19 prevents damage to the bellows 19 if it should come into contact with the ring 21 due to centrifugal forces. The ring 21 also contributes to holding the bellows 19 near the shaft 9 and therefore to limiting the effect of centrifugal forces on the bellows 19. The distance between the bead 33 and the first shaft 9 is chosen to allow the first shaft 9 and the bellows 19 to move angularly and axially relative to the second shaft without pinching the bellows between the shaft 9 and the ring 21.

The ring 21 of course has the same function of stabilizing the bellows 19 when the transmission joint 1 is exposed to high-temperature and/or low-pressure environment.

FIG. 5 shows a second embodiment of the invention differing from the previous embodiment only in the following respects.

The axially internal end of the ring 21 has a portion 39 bent perpendicularly towards the axis XX'. The portion 39 is extended by a portion 41 bent outwards and terminating in a rounded rim. The two portions 39 and 41 and the connections between them have surfaces with no sharp edges facing the turned back portion of the bellows 19. As previously, there are no sharp edges projecting towards the bellows 19 beyond the tangent common to the part 41 and to the flare 34 at the axially external end of the ring and, in the direction towards the turned back portion 24, the parts 39 and 41 are beyond the inner boundary of the fixing of the free end of the turned back portion to the cover 11.

The parts 39 and 41 provide a minimal clearance that is just sufficient to prevent pinching of the bellows when the first shaft 9 is at the maximum angle relative to the second shaft. This maximal angular position is shown in chain-dotted line in FIG. 5.

This embodiment therefore optimizes the stabilizing of the bellows 19 since the ring 21 holds the bellows as close as possible to the first shaft 21.

FIG. 6 shows a third embodiment of the invention differing from the first embodiment of the invention in that the ring 21 is screwed onto the turned back portion of the free end 13 of the cover 11. This enables the axial position of the ring 21 relative to the cover 11 to be adjusted. The ring 21 is fixed in the chosen axial position by means of a spot of glue, for example.

FIG. 7 shows a fourth embodiment of the invention. In this embodiment the free end of the turned back portion of the bellows 19 is fixed, for example glued, to the radially internal surface of the free end 13 of the cover 11, which is not turned back but is cylindrical in shape.

The axially external end of the ring 21 is bent outwards to form a cylindrical jacket 45 which cooperates with the radially external surface of the cover 11.

To this end the envelope 45 of the ring 21 has a snap fastener bead 47 engaged in a groove 49 on the radially external surface of the cover 11. The bead 47 therefore holds the ring 21 axially in position relative to the cover 11. As in the first embodiment a slight axial clearance between the ring 21 and the cover 11 can be tolerated.

The axially internal part of the ring 21 has the same features as the ring 19 from the first embodiment, also enabling the bellows 19 to be stabilized without damage at high rotation speeds and in high-temperature and/or low-pressure environments.

Alternatively, the ring shown in FIG. 7 can of course be screwed onto the cover 11, the screwthreads being formed on the radially external surface of the free end 13 of the cover 11 and on the radially internal surface of the part 45 of the ring 19.

FIG. 8 shows a fifth embodiment differing from the first embodiment in the following respects.

The bent free end 13 of the cover 11 is extended by an inwardly bent rim 51 having a substantially toroidal surface facing the turned back portion of the bellows 19 and inside the latter extending towards the back of the turned back portion beyond the inner boundary of fixing of the free end of the turned back portion of the bellows 19 to the cover 11.

The rings in the embodiments of FIGS. 1, 2, 5, 6 and 7 can comprise one or more plastics material parts.

The claims should be studied to determine the scope of this invention.

What is claimed is:

1. A bellows device (17) including an elastic bellows (19) connected at a first end to a first rotary member (9) and a second end of which has a portion (24) turned back axially outwards, a free end of this turned back portion fixed to a second rotary member (11), the bellows device including a rigid member (21) for stabilizing the bellows (19), the rigid member including a radially external connecting part that axially retains said rigid member relative to the second rotary member (11) and a radially internal part (33) extending from the radially external connecting part axially towards the turned back portion (24) and radially towards the first rotary member inside the turned back portion, and said radially internal part having an annular surface facing the bellows (19) that is free of sharp edges, wherein the radially internal part (33) of the rigid member (21) extends axially towards a back of the turned back portion (24) and extends beyond an axially inside boundary of the fixed portion of the free end of the turned back portion that is fixed to the secondary rotary member.

2. A bellows device according to claim 1 characterized in that said annular surface is substantially toroidal.

3. A bellows device according to claim 1 characterized in that said annular surface extends radially towards the first rotary member (9) with a minimal clearance for relative movement of the first rotary member and the bellows (19).

4. A bellows device according to claim 1 characterized in that the free end of the turned back portion (24) has an annular bead (27), the second rotary member (11) includes a cover having a free end (13) that is bent and forms a groove (15) in which the bead (27) is housed and fixed to the second rotary member, and in that the rigid member is a ring (21) having one or more parts, an axially internal end of said ring constitutes said radially internal part (33) extending from the radially external connecting part axially towards the turned back portion (24) and a radially external connecting part of said ring engages a radially internal surface of the free end (13) of said cover of the second rotary member (11) to axially retain said ring relative to the second rotary member.

5. A bellows device according to claim 4 characterized in that the radially external connecting part of the ring (21) is flared outwards at an axially external end of the ring and also has a shoulder (35) for snap fastening and axially retaining the ring (21) relative to the second rotary member (11), said shoulder adapted to bear on an edge of said free end (13) of the cover of the secondary rotary member.

6. A bellows device according to claim 1 characterized in that the rigid member (19) is a ring (21) having one or more parts, an axially external end of said ring bent outwards to form a cylindrical jacket (45) having a snap fastener bead (47) that cooperates with a radially external surface of the second rotary member (11) to retain the ring (21) axially with respect to the second rotary member (11).

7. A bellows device according to claim 1 characterized in that both said second rotary member (11) and said rigid member (21) include mutually engagable threads for adjusting and maintaining the axial position of said rigid member (21) relative to the second rotary member (11).

8. A ring (21) having one or more parts constituting a stabilizing member for a bellows device including an elastic bellows (19), the elastic bellows (19) is adapted to be connected at a first end to a first rotary member (9) and a second end of which has a portion (24) turned back axially outwards, a free end of this turned back portion being adapted to be fixed to a second rotary member (11), the ring (21) including a radially external connecting part adapted to assure axial retention of said ring (21) relative to the second rotary member (11) and a radially internal part (33) extending from the radially external connecting part axially towards the turned back portion (24) and radially towards the first rotary member inside the turned back portion (24), and said radially internal part (33) having an annular surface facing the bellows (19) that is free of sharp edges, wherein the radially internal part (33) of the ring (21) extends axially towards a back of the turned back portion (24) and extends beyond an axially inside boundary of the fixed portion of the free end of the turned back portion that is adapted to be fixed to the secondary rotary member.

9. A transmission joint (1) including a first rotary member (9), a second rotary member (11) and a bellows device (17) including an elastic bellows (19), the elastic bellows (19) connected at a first end to the first rotary member (9) and a second end of which has a portion turned back axially outwards, a free end of this turned back portion having an annular bead (27) that is fixed to the second rotary member (11) by being received in and contacting a groove (15) formed by bending over a free end (13) of a cover of the second rotary member (11), the free end (13) of the cover extending beyond an axially inside boundary of the fixed portion of the annular bead (27) to the groove (15) axially towards a back of the turned back portion (24), and having an inwardly bent rim (51) extending radially toward the first rotary member inside the turned back portion (24) and said inwardly bent rim (51) having an annular toroidal surface facing the bellows (19) that is free of sharp edges.

* * * * *